United States Patent [19]

Ueda

[11] 4,375,721
[45] Mar. 8, 1983

[54] COLLAPSIBLE RESTRAINT FOR MEASURING TAPES

[75] Inventor: Herbert T. Ueda, Claremont, N.H.

[73] Assignee: The United States of America as represented by the Secretary of the Army, Washington, D.C.

[21] Appl. No.: 316,205

[22] Filed: Oct. 29, 1981

[51] Int. Cl.³ .............................. G01B 3/02; G01B 3/10
[52] U.S. Cl. .................................. 33/137 R; 33/169 R
[58] Field of Search ............ 33/169 B, 169 R, 137 R, 33/452, 496, 497, 465, 484

[56] References Cited

U.S. PATENT DOCUMENTS

| 232,988 | 10/1880 | Lowe et al. | 33/452 |
|---|---|---|---|
| 1,135,743 | 4/1915 | Walker | 33/452 |
| 1,150,600 | 8/1915 | Jay | 33/169 B |
| 1,303,756 | 5/1919 | Ballou | 33/137 R |
| 1,378,536 | 5/1921 | Flynn | 33/126.7 R |
| 1,403,376 | 1/1922 | Ballou | 33/137 R |
| 1,567,602 | 12/1925 | Keuffel | 33/137 R |
| 1,893,600 | 1/1933 | Shull | 33/178 B |
| 2,179,658 | 11/1939 | Gallagher | 33/169 B |
| 2,368,589 | 1/1943 | Bierman | 33/126.7 A |
| 2,465,530 | 3/1949 | Gerber | 33/169 R |
| 2,470,498 | 5/1949 | Lankhford | 33/169 B |
| 2,495,558 | 1/1950 | Walton | 33/452 |
| 2,549,287 | 4/1951 | Brennan | 33/137 R |
| 2,629,935 | 3/1953 | Roe | 33/137 R |
| 2,683,933 | 7/1954 | McFarland | 33/452 |
| 3,321,835 | 5/1967 | Curtis | 33/169 R |
| 3,716,922 | 2/1973 | Shauer | 33/169 R |
| 3,965,579 | 6/1976 | Woods | 33/137 R |

FOREIGN PATENT DOCUMENTS 1133481  3/1957  France .............. 33/169 R

Primary Examiner—Willis Little
Attorney, Agent, or Firm—Darrell E. Hollis

[57] ABSTRACT

A collapsible restraint is provided for attachment to the end of a flexible measuring tape in order to allow the thickness of a material, such as an ice layer covering a lake or other body of water, to be measured through a hole in the material. The collapsible restraint includes first and second pivotally connected blades which are maintained in a fully extended position by a locking arrangement to allow the blades to engage the bottom opening of the hole. The locking arrangement can be disabled by an upward pull on the flexible measuring tape in order to cause the blades to pivot to a collapsed position, thereby permitting the restraint to be withdrawn from the hole.

20 Claims, 6 Drawing Figures

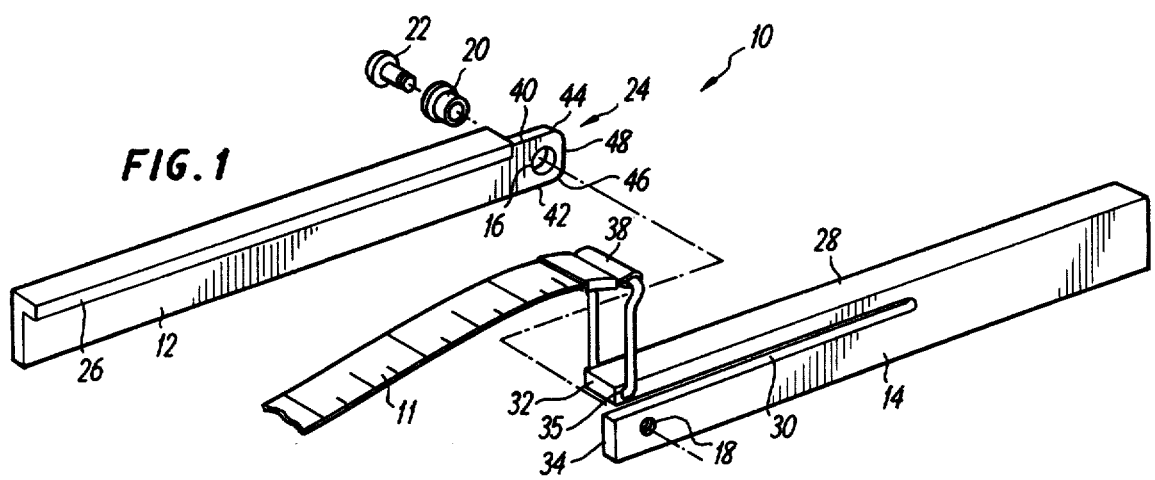
FIG. 1
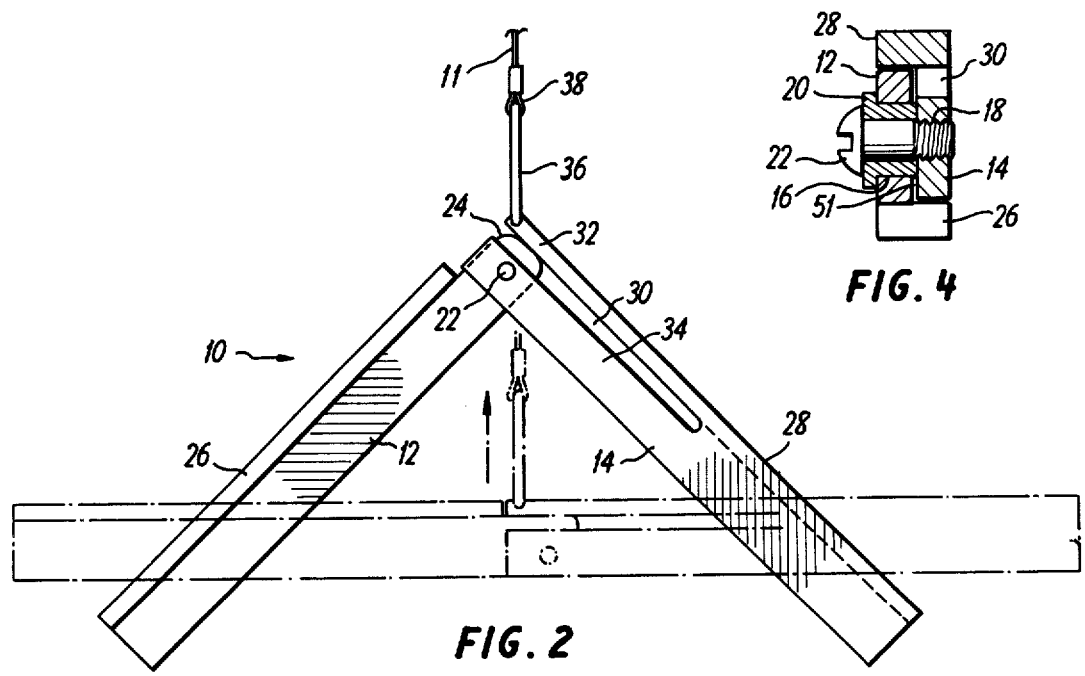
FIG. 4
FIG. 2
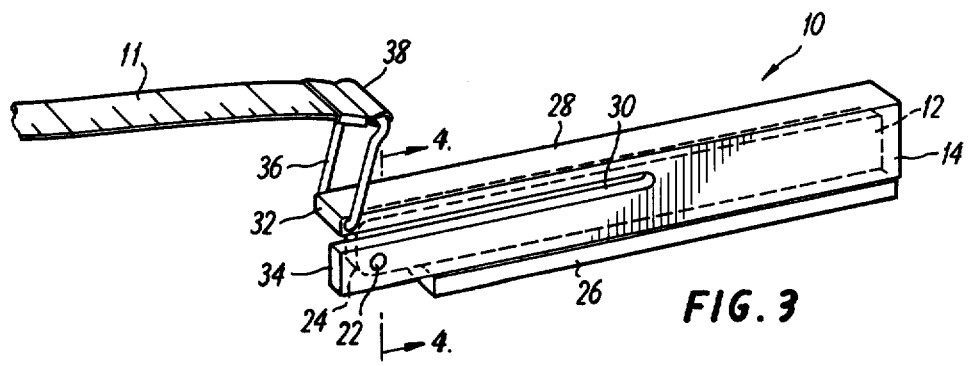
FIG. 3

COLLAPSIBLE RESTRAINT FOR MEASURING TAPES

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

1. Field of the Invention

The present invention relates generally to apparatus for measuring the thickness of materials, and is particularly concerned with a collapsible restraint which can be attached to a flexible measuring tape for measuring the thickness of an ice cover over a lake or other body of water.

2. Description of the Prior Art

It is common in the art to measure the thickness of a material by measuring the depth of a hole provided in the material, and a number of different devices have been employed for this purpose. In U.S. Pat. No. 2,470,498, for example, a device is disclosed for measuring the thickness of the refractory brick layer which forms the roof of an open hearth furnace, such furnaces being subject to deterioration by erosion which results in an eventual reduction in the thickness of the roof. The device is provided in the form of an elongated vertical tube which encloses a slide rod having a handle at its upper end and a pivoting detent at its lower end. The detent can be pivoted by means of the handle between a retracted position in which the detent is confined within the walls of the outer tube and a deployed position in which the ends of the detent project through slots in the side walls of the tube. In use, the detent is maintained in the retracted position and the vertical tube is inserted into a bore provided in the furnace roof until the slots in the tube have moved past the bottom opening of the bore. The handle is then operated to move the detent to its deployed position, whereupon the device as a whole is raised to bring the detent into engagement with the bottom edges of the hole. A measuring rod slidably attached to the upper portion of the outer tube is then used to obtain a measurement of the hole depth, which provides an indication of the amount of erosion which has taken place on the inner surface of the furnace.

Although the foregoing type of device is useful for measuring the thickness of slowly eroding walls and the like, where the material thickness will not be expected to vary a great deal between successive measurements, it is not well suited for applications in which the material thickness may vary over a wide range. An ice layer covering a lake or other body of water, for example, may be less than an inch thick or several feet thick, depending on climatic conditions and other factors. In order to measure the thickness of such ice layers, the device of U.S. Pat. No. 2,470,498 would have to be made long enough to completely penetrate an ice layer of the maximum expected thickness, which would result in a device of unmanageably large size.

In measuring the thickness of ice layers over bodies of water, it has been the practice to employ a flexible measuring tape having a steel rod attached to one end thereof. The rod and tape are passed through a hole which has been drilled in the ice cover, with the rod maintained in a generally vertical position to clear the sides of the hole. With the aid of an additional length of string or wire attached to the rod, the rod is positioned horizontally to bridge across the bottom of the hole and to provide a restraint for the tape. The tape can then be drawn up taut in order to allow the thickness of the ice layer to be measured. After the measurement has been completed, the string or wire is manipulated to position the rod vertically once again, whereupon the rod, tape and the additional length of string or wire are pulled back through the hole and up to the surface.

The foregoing type of material thickness measuring apparatus is advantageous because it can be used to measure ice layers of widely varying thickness, the range of measurement being limited only by the length of the measuring tape. Of course, since the measuring tape is flexible and can be easily rolled up for storage, it can be made quite long without rendering the apparatus difficult to store or transport. Some difficulty is encountered, however, in the use of the additional length of string or wire to move the rod between the vertical and horizontal positions. Since the position of the rod is not usually apparent to the user when the rod is located at the bottom opening of the hole in the ice layer, it is often necessary to manipulate the string or wire several times in order to place the rod in the proper vertical orientation for removal from the hole. This is a rather cumbersome procedure which results in an undesirable increase in the amount of time needed to complete the measurement procedure.

SUMMARY OF THE INVENTION

In accordance with the present invention, the foregoing disadvantages are avoided by replacing the conventional steel rod with a collapsible restraint which requires no additional strings or wires to position it for proper insertion into and removal from the hole through which the material thickness measurement is made. The collapsible restraint comprises, in particular, first and second elongated blades made of metal or some other suitable material, means providing a pivotal connection between one end of the first blade and one end of the second blade, and locking means for locking the first and second blades in a fully extended position in which the blades are in opposed and substantially non-coincident alignment with each other so as to lie substantially along a straight line having the pivotal connection at an intermediate point thereon. The locking means is disabled in response to a force applied near the pivotal connection between the first and second blades to allow the blades to pivot relative to each other from the fully extended position to a collapsed position in which the blades no longer lie along a straight line. Attachment means is provided for attaching the end of a flexible measuring tape to at least one of the first and second blades at a point near the pivotal connection therebetween. In this way, a tension force may be applied through the flexible measuring tape to disable the locking means and to cause the blades to pivot relative to each other from the fully extended position to a collapsed position.

In use, the restraint is attached to the end of a flexible measuring tape and the first and second blades are placed in the fully extended position. In this position of the blades, the restraint may be lowered into the hole in a vertical orientation in the same manner as the steel rods previously used for this purpose. When the restraint reaches the bottom opening of the hole, the counterbalancing moments of the two blades cause the restraint to assume a horizontal orientation, whereupon the outer ends of the blades will engage the bottom edges of the hole and serve as a restraint for the flexible measuring tape. The measuring tape can then be drawn up taut in order to allow the desired thickness measurement to be made. When the measurement is completed, a sharp upward tug on the measuring tape will disable the locking means between the first and second blades and cause the blades to pivot relative to each other to a collapsed position. In this position, the blades no longer lie along a straight line, and the overall length of the restraint is reduced sufficiently to allow the restraint to be pulled back through the hole and up to the surface.

BRIEF DESCRIPTION OF THE DRAWINGS

The various objects, advantages and novel features of the invention will be more readily apprehended from the following detailed description when read in conjunction with the appended drawings, in which:

FIG. 1 is an exploded perspective view of a collapsible restraint constructed in accordance with the present invention, together with a portion of the measuring tape to which the restraint will normally be attached;

FIG. 2 is a front elevational view illustrating the collapsible restraint of FIG. 1 in its fully assembled form, with the fully extended position of the two blades of the restraint shown in phantom outlines;

FIG. 3 is a perspective view illustrating the collapsible restraint of FIGS. 1 and 2 in its fully closed or storage position;

FIG. 4 is a cross-sectional view taken along the line 4—4 in FIG. 3;

Throughout the drawings, like reference numerals will be understood to refer to like parts.

DETAILED DESCRIPTION OF THE PREFERRED EMBODIMENT

Figure 5:
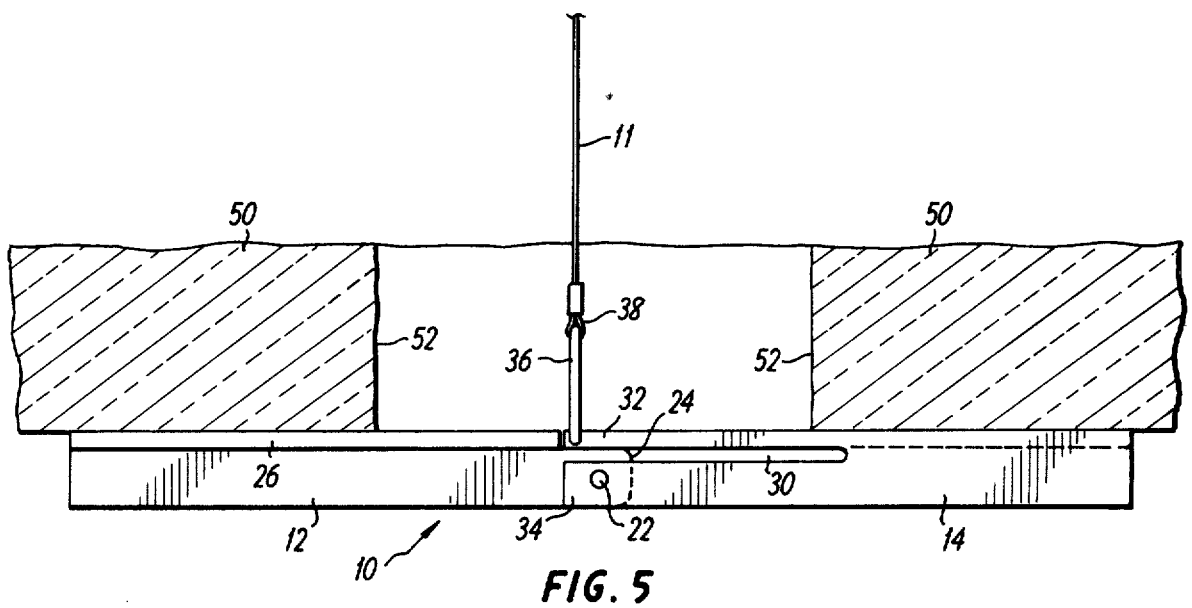
FIG. 5 is a front elevational view illustrating the collapsible restraint of FIGS. 1-4 in its fully extended position, with the opposed blades of the restraint engaging the bottom edges of a hole through which a material thickness measurement is being made.

A collapsible restraint 10 constructed in accordance with the present invention is illustrated in FIGS. 1-4, together with a portion of the flexible measuring tape 11 to which the restraint will normally be attached. As best seen in the exploded view of FIG. 1, the collapsible restraint 10 comprises first and second elongated blades 12 and 14, respectively, which may be made of metal or some other suitable material. One end of the first blade 12 is provided with a smooth bore 16, and one end of the second blade 14 is provided with a somewhat smaller bore 18 which is internally threaded. A bushing or bearing 20 is received in the bore 16, and a screw 22 passes through the bushing 20 and engages the threaded bore 18 in order to provide a pivotal connection between the two blades 12, 14. The first blade 12 is provided with a rounded cam surface 24 which is formed on the end of the blade 12 that is pivotally connected to the second blade 14. The cam surface 24 preferably extends completely around the end of the first blade 12, as shown, for a purpose to be described shortly. The blade 12 is also provided with a projecting flange portion 26 which extends along the upper longitudinal edge thereof, but which terminates somewhat behind the end of the blade 12 which includes the bore 16 and cam surface 24. The second blade 14 is provided with a similar but oppositely-facing projecting flange portion 28 along the upper longitudinal edge thereof, although in this case the flange portion 28 extends the entire length of the blade 14. The second blade 14 is also provided with an open-ended longitudinal slot 30 at the end of the blade 14 which is pivotally connected to the first blade 12. The slot 30 occupies only a portion of the length of the second blade 14 and serves to define two integral cantilevered arms 32, 34 having free end portions at the end of the second blade 14 which is pivotally connected to the first blade 12. It will be observed that the upper edge of the slot 30 is at the same level as the lower edge of the projecting flange portion 28 of the second blade 14. As a result, the upper cantilevered arm 32 has a greater thickness than the lower cantilevered arm 34, and therefore extends beyond the plane of the cantilevered arm 34 in the direction toward the adjoining edge of the first blade 12. The greater thickness of the upper cantilevered arm 32 is continued along the remaining length of the second blade 14 in the form of the projecting flange portion 28. The upper cantilevered arm 32 is provided with a transverse bore 35 near the free end thereof for receiving an attachment ring 36. The measuring tape 11 is terminated by an eyelet 38 through which the attachment ring 36 passes. The measuring tape 11 preferably comprises a strip of cloth or other flexible material with suitable graduated markings thereon, as shown, for use in the material thickness measurement as will be described hereinafter. It should be noted that the measuring tape 11, eyelet 38 and ring 36 are often sold commercially as a unit, with the markings or calibrations on the tape 11 being such that the length measurement will include the length of the eyelet 38 and ring 36.

With particular reference now to FIG. 2, in which the collapsible restraint 10 is illustrated in its fully assembled condition, it will be observed that the lower cantilevered arm 34 of the second blade 14 is in abutting contact with the front side of the first blade 12 at the end of the first blade 12 which is pivotally connected to the second blade 14. Due to the greater thickness of the upper cantilevered arm 32 which causes it to extend in the direction toward the adjoining edge of the first blade 12 (i.e., in the direction into the page in FIG. 2), it will be apparent that the free end portion of the upper cantilevered arm 32 is brought into overlying contact with the cam surface 24 that is formed on the end of the first blade 12. If it is now supposed that the blades 12 and 14 are pivoted relative to one another about the screw 22, it will be seen that the free end portion of the upper cantilevered arm 32 will be urged into contact with and deflected by the cam surface 24 as it travels around the same. The extent of deflection at any point will, of course, depend upon the radius of the cam surface 24 at that point as measured from the center of the screw 24. In practice, the dimensions of the upper cantilevered arm 32 and the curvature of the cam surface 24 are chosen so that the maximum amount of deflection of the upper cantilevered arm 32 is within the elastic limit of the material used for the blade 14. In this way, the upper cantilevered arm 32 serves as a resilient arm which, in cooperation with the cam surface 24, provides resistance to the pivoting of the two blades 12 and 14 about the screw 22.

As shown in FIG. 1, the cam surface 24 preferably includes flat upper and lower portions 40 and 42, respectively, which are separated by curved upper and lower corner portions 44 and 46, respectively, and by an intermediate portion 48 at the inner end of the first blade 12. The cam surface 24 as a whole, including the flat portions 40, 42, the curved portions 44, 46, and the intermediate portion 48, therfore extends completely around the inner end of the first blade 12. The effective radius of the curved corner portions 44 and 46, measured from the center of the screw 22, is greater than the effective radius of the flat upper and lower portions 40 and 42 measured from the same point. As a result, the upper cantilevered arm 32 will be deflected to the greatest extent when it is in contact with the curved corner portions 44 and 46, and will be deflected to a lesser extent when it is in contact with one of the flat upper and lower portions 40 and 42. As will be described shortly, this provides a desirable locking-in-place function for the collapsible restraint 10 when the blades 12, 14 are in the fully extended position, as shown by the phantom lines in FIG. 2, and also when the blades are in the fully closed position as will be described shortly in connection with FIGS. 3 and 4. The intermediate portion 48 of the cam surface 24 between the curved corner portions 44 and 46 may be made flat, as shown, in order to provide a further locking position for the blades 12, 14 at an intermediate point between the fully extended and fully closed positions. Alternatively, the intermediate portion 48 of the cam surface 24 may be merged with the curvature of the corner portions 44, 46 to form a continuous curved surface connecting the flat upper and lower portions 40, 42.

In the fully extended position of the collapsible restraint 10, which is illustrated in phantom outlines in FIG. 2, the first and second blades 12, 14 are in opposed 180° alignment with each other on either side of the screw 22. In this position, therefore, the two blades are substantially non-coincident or non-overlapping with each other and lie substantially along a straight line which has the screw 22 approximately at its midpoint. The upper cantilevered arm 32, which is now in contact with the flat upper portion 40 of the cam surface 24 on the inner end of the first blade 12, will tend to lock the blades in this position, inasmuch as clockwise rotation of the blade 14 about the screw 22 (or, equivalently, counterclockwise rotation of the blade 12 about the screw 22) would tend to deflect the arm 32 upwardly against the elastic force of the material which forms the second blade 14. However, if a sufficient upward force is applied to the restraint 10 at a point near the pivotal connection defined by the screw 22, as by a sharp upward pull on the measuring tape 11 with the outer ends of the blades 12, 14 restrained by the bottom edges of a hole, the resistance provided by the resilient arm 32 will be overcome. The blades 12, 14 will then be pivoted relative to each other to a collapsed position, as shown in solid outlines in FIG. 2. In this position, the first and second blades 12, 14 form an angle of less than 180° relative to each other and therefore do not lie along a straight line. As will be seen, the collapsed position of the restraint 10 allows the restraint to be conveniently removed from a hole after the material thickness has been measured, since the overall length of the restraint has effectively been reduced to a point where it is less than the diameter of the hole. It will be appreciated that an unlimited number of different collapsed positions of the restraint 10 are possible, depending upon how far the blades 12 and 14 pivot relative to one another in response to the upward tension force applied to the measuring tape 11.

FIG. 3 illustrates the collapsible restraint 10 in the fully closed or storage position, wherein the blades 12, 14 have been pivoted to a point where they substantially completely overlap each other. In this position, the resilient arm 32 of the second blade 14 is in contact with the flat lower portion 42 of the cam surface 24 formed on the end of the first blade 12. Pivotal motion of the blades 12, 14 out of the closed position is resisted by the deflection of the resilient arm 32 as it travels over the rounded corner portion 46 of the cam surface 24, so that the resilient arm 32 provides a locking-in-place function in the fully closed position of the blades 12, 14 as it does in the fully extended position of the blades. The resilient arm 32 and cam surface 24 are preferably proportioned so that only moderate manual force is required to separate the blades 12, 14 when the collapsible restraint 10 is in the fully closed position. It will be observed that, in the fully closed position of the collapsible restraint 10, the projecting flange portion 26 of the first blade 12 provides an abutment surface for the adjacent longitudinal edge of the second blade 14, and the projecting flange portion 28 of the second blade 14 likewise provides an abutment surface for the adjacent longitudinal edge of the first blade 12. This relationship can be more clearly seen in FIG. 4, which is a cross-sectional view taken along the line 4—4 in FIG. 3. The symmetrically-positioned flange portions 26, 28 thus act as stops for defining the fully closed positions of the blades 12, 14, and also provide the fully closed restraint 10 with a compact rectangular shape in cross-section (visible in FIG. 4) to facilitate carrying and storage. The flange portion 26 of the first blade 12 also functions to prevent inadvertent opening of the blades 12, 14 to a position beyond the fully extended position. Thus, with reference to the phantom representation of the restraint 10 in the fully extended position in FIG. 2, it will be apparent that any attempt to further pivot the second blade 14 in a counterclockwise direction about the screw 22 (or, equivalently, to further pivot the first blade 12 in a clockwise direction about the screw 22) will cause the end of the upper cantilevered arm 32 on the second blade 14 to strike the end of the projecting flange portion 26 on the first blade 12.

The details of the pivotal connection between the ends of the blades 12, 14 will now be described with reference to FIG. 4. As illustrated, a bushing 20 is received in the smooth bore 16 which is formed near the end of the first blade 12. The bushing 20 in turn receives a screw 22 which is engaged with the internally threaded bore 18 provided near the end of the second blade 14. The length of the shank portion of the bushing 20 is slightly greater than the thickness of the first blade 12, so that a gap 51 is created between the side surfaces of the two blades 12 and 14 when the screw 22 is tightened into engagement with the threaded bore 18. The bushing 20 thus prevents direct frictional contact between the blades 12 and 14, which might otherwise make it difficult to open and close the blades, and serves as a bearing to allow the blades to pivot freely relative to one another under the control of the resilient arm 32 and cam surface 24.

Figure 6:
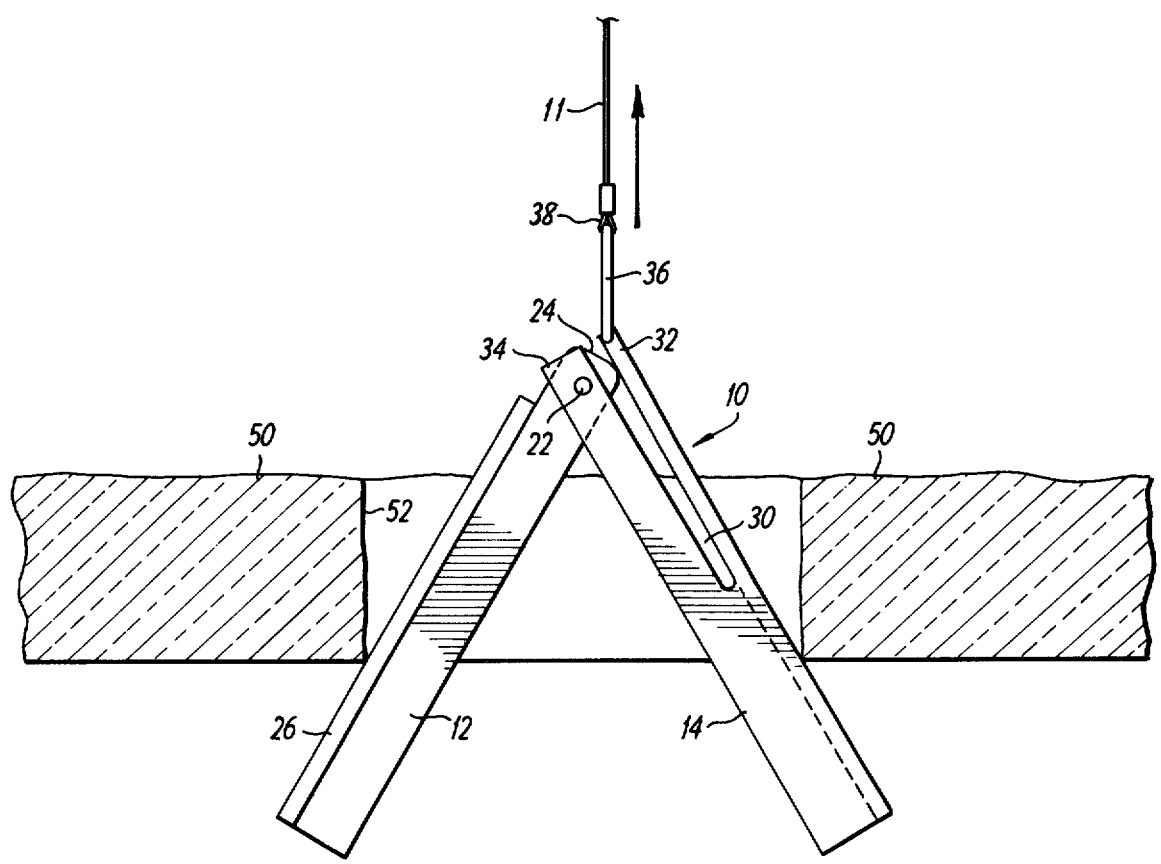
FIG. 6 is a front elevational view similar to that of FIG. 5, illustrating the manner in which the restraint is caused to assume a collapsed position in response to an upward pull on the measuring tape to which the restraint is attached.

The manner in which the collapsible restraint 10 of the present invention may be used to measure the depth of a layer 50 of ice or other material will now be described with reference to FIGS. 5 and 6. It should be noted that only the lower portion of the layer of material 50 is shown in FIGS. 5 and 6; in practice, the thickness of the ice or other material will often be several times the length of the fully extended restraint 10. At the outset, a hole 52 is formed in the material, by drilling or otherwise, to allow access for the measuring tape 11 and the attached collapsible restraint 10. The restraint 10 is then placed in the fully extended position, as illustrated in phantom outlines in FIG. 2, and is lowered into the hole 52 in a generally vertical orientation (i.e., generally in alignment with the vertical axis of the hole) using the flexible measuring tape 11. When the collapsible restraint 10 has moved completely past the bottom edges of the hole, the restraint assumes a horizontal orientation due to the counterbalancing moments exerted about the attachment ring 36 by the opposing blades 12 and 14, which are approximately equal in length and mass. The flexible measuring tape 11 may now be drawn up taut to cause the blades 12, 14 to firmly engage the bottom edges of the hole, as illustrated in FIG. 5. The graduations on the tape 11 may now be read at the upper edge (not shown) of the hole 52 to obtain the desired measurement of the thickness of the material 50. After the measurement has been made, a sharp upward pull is exerted on the measuring tape 11 from the surface. Since the outer ends of the blades 12, 14 are restrained by the bottom edges of the hole 52, the upward force applied through the tape 11 will exert a bending moment about the screw 22, causing the baldes 12, 14 to pivot toward a collapsed position as shown in FIG. 6. When the blades reach a point where the effective length of the collapsible restraint 10 is approximately equal to the diameter of the hole 52, the restraint 10 may be withdrawn from the hole and brought up to the surface by reeling in the flexible tape 11.

It should be noted that the ring 36 of the measuring tape 11 may, if desired, be attached to the collapsible restraint 10 at points other than the end of the resilient arm 32. For example, if the elongated blades 12 and 14 are pivotally connected by means of a hollow rivet or the like, rather than by means of the screw 22 and collar 20, the ring 36 may be passed through the rivet in order to apply the collapsing force directly at the pivot point between the two blades. However, the arrangement illustrated in the drawings, wherein the ring 36 passes through a transverse bore in the resilient arm 32, is advantageous for at least two reasons. In the first place, this arrangement results in the end of the ring being placed substantially at the level of the bottom opening of the hole 52 during the measurement procedure, as will be apparent from FIG. 5. Since the graduated markings on the measuring tape 11 will usually be referenced to the end of the ring 36, and since the amount of offset between the end of the ring 36 and the bottom opening of the hole 52 is small, this allows the material thickness to be read directly from the tape in most instances. Of course, in situations where greater precision is required, an appropriate correction factor can be used. Another advantage resulting from the attachment of the ring 36 to the resilient arm 32 is that it causes the arm 32 to be pulled slightly away from the cam surface 24 when a tension force is applied to the measuring tape 11. This facilitates moving the restraint 10 to a collapsed position when it is desired to remove the restraint from the hole in the material being measured.

In an exemplary embodiment of the invention, each of the blades 12 and 14 is about 5 inches in length, ¾ inch in width, and ⅛ inch in thickness, with the flange portions 26 and 28 projecting out from the sides of the blades 12 and 14 by an additional ⅛ inch. These dimensions render the collapsible restraint suitable for hole diameters of between about 1 inch and 4 inches, although it is of course possible to modify the dimensions of the restraint to suit a wide range of hole sizes. In all embodiments, however, it is preferred that the blades 12 and 14 be of approximately equal length and mass, since this allows the restraint to assume a true horizontal orientation when it reaches the bottom opening of the hole. In this connection, it should be noted that the presence of the projecting flange portions 26, 28 on both blades, rather than only one, is preferable because it tends to equalize the weights of the two blades. The blades 12, 14 may be made of any suitable material, but a metal with a high elastic limit, such as cold-rolled or stainless steel, is preferred. A coating of chromium or chromium alloy may be applied to the blades to inhibit rusting due to repeated immersion in water. Brass can also be used for the blades 12, 14, although this material is somewhat less advantageous from the standpoint of elasticity. The flexible measuring tape 11 will usually comprise a strip of cloth with suitable graduated markings, but it may alternatively comprise a thin strip of plastic, metal, or any other suitable material. Graduated markings are preferably provided on the tape 11 as shown in the drawings, but these may be omitted if desired. In the latter event, a mark may be placed on the tape at the top opening of the hole and the material thickness can be determined at a later time by measuring the distance between the collapsible restraint 10 and the mark which has been made on the tape.

Although the present invention has been described with reference to a preferred embodiment, the invention is not limited to the details thereof. A number of possible modifications and substitutions have been suggested in the foregoing detailed description, and others will occur to those of ordinary skill in the art. All such substitutions and modifications are intended to fall within the scope of the invention as defined in the appended claims.

What is claimed is:

1. A collapsible restraint for attachment to the end of a flexible measuring tape, comprising:
    (a) first and second elongated blades, one end of said first blade being pivotally connected to one end of said second blade such that said first and second blades may be pivoted from a fully extended position in which said blades are in opposed 180° alignment with each other on either side of said pivotal connection to a collapsed position in which the blades form an angle of less than 180° relative to each other;
    (b) locking means for locking said first and second blades in the fully extended position, said locking means being disabled in response to a force applied at a point near the pivotally connected ends of said first and second blades to allow said blades to pivot from the fully extended position to a collapsed position, said locking means comprising:
        (1) a cam surface formed on the end of the first blade which is pivotally connected to the second blade; and
        (2) a resilient arm extending along the second blade and terminating at the end of said second blade which is pivotally connected to said first blade, said resilient arm having a free end portion which is urged into contact with and deflected by the cam surface formed on the end of the first blade as the first and second blades are pivoted relative to each other; and (c) attachment means for attaching the end of a flexible measuring tape to at least one of said first and second blades at a point near the pivotally connected ends of said first and second blades.

2. A collapsible restraint as claimed in claim 1, wherein said resilient arm is integral with said second blade.

3. A collapsible restraint as claimed in claim 2, wherein an open-ended longitudinal slot is formed in the end of the second blade which is pivotally connected to the first blade, said slot occupying only a portion of the length of the second blade and serving to define two integral cantilevered arms with free end portions at said end of the second blade, and further wherein said resilient arm comprises one of the two integral cantilevered arms defined at said end of the second blade.

4. A collapsible restraint as claimed in claim 3, wherein the free end portion of the other of said two cantilevered arms is in abutting contact with one side of the first blade at the end of said first blade which is pivotally connected to the second blade, and wherein the first-mentioned one of said two cantilevered arms has a greater thickness than the other of said two cantilevered arms so as to extend beyond the plane of said other cantilevered arm in the direction toward the adjoining edge of the first blade, whereby the free end portion of said one cantilevered arm is brought into overlying contact with the cam surface formed on the end of the first blade.

5. A collapsible restraint as claimed in claim 4, wherein said attachment means is provided on said first-mentioned one of the two cantilevered arms defined at the end of the second blade.

6. A collapsible restraint as claimed in claim 5, wherein the first and second blades are pivotal to a fully closed position in which said blades substantially completely overlap each other, and wherein said cam surface extends sufficiently far around the end of the first blade to permit said first and second blades to be locked in the fully closed position.

7. A collapsible restraint as claimed in claim 6, wherein the first blade includes a first projecting flange portion extending along one longitudinal edge thereof, said flange portion providing an abutment surface for the adjacent longitudinal edge of the second blade when the blades are in the fully closed position.

8. A collapsible restraint as claimed in claim 6, wherein the greater thickness of said one cantilevered arm is continued along substantially the entire length of the second blade to form a second projecting flange portion extending along one edge of said second blade, said second projecting flange portion being symmetrically positioned relative to said first projecting flange portion and providing an abutment surface for the adjacent longitudinal edge of the first blade when the blades are in the fully closed position.

9. In an apparatus for measuring the thickness of ice and other materials, said apparatus including a flexible measuring tape adapted to be lowered through a hole in the material and an elongated restraining device attached to one end of the measuring tape for engaging the bottom opening of the hole, the improved restraining device which comprises:

(a) first and second elongated blades;

(b) means providing a pivotal connection between one end of said first blade and one end of said second blade;

(c) locking means for locking said first and second blades in a fully extended position in which the blades are in opposed and substantially non-coincident alignment with each other on either side of said pivotal connection so as to lie substantially along a straight line having said pivotal connection at an intermediate point thereon, said locking means being disabled in response to an upward force applied at a point near said pivotal connection to allow said first and second blades to pivot relative to each other from the fully extended position to a collapsed position in which said first and second blades do not lie along a straight line; and (d) attachment means for attaching the end of said flexible measuring tape to at least one of said first and second blades at a point near said pivotal connection, whereby a tension force may be applied through said measuring tape to disable said locking means and to cause said first and second blades to pivot relative to each other from the fully extended position to a collapsed position.

10. An apparatus as claimed in claim 9, wherein said locking means comprises:

(a) a cam surface formed on the end of the first blade which is pivotally connected to the second blade;

(b) a resilient arm extending along the second blade and terminating at the end of said second blade which is pivotally connected to said first blade, said resilient arm having a free end portion which is urged into contact with and deflected by the cam surface formed on the end of the first blade as the first and second blades are pivoted relative to each other.

11. An apparatus as claimed in claim 10, wherein said resilient arm is integral with said second blade.

12. An apparatus as claimed in claim 11, wherein an open-ended longitudinal slot is formed in the end of the second blade which is pivotally connected to the first blade, said slot occupying only a portion of the length of the second blade and serving to define two integral cantilevered arms with free end portions at said end of the second blade, and further wherein said resilient arm comprises one of the two integral cantilevered arms defined at said end of the second blade.

13. A collapsible restraint as claimed in claim 12, wherein the free end portion of the other of said two cantilevered arms is in abutting contact with one side of the first blade at the end of said first blade which is pivotally connected to the second blade, and wherein the first-mentioned one of said two cantilevered arms has a greater thickness than the other of said two cantilevered arms so as to extend beyond the plane of said other cantilevered arm in the direction toward the adjoining edge of the first blade, whereby the free end portion of said one cantilevered arm is brought into overlying contact with the cam surface formed on the end of the first blade.

14. A collapsible restraint as claimed in claim 13, wherein said attachment means is provided on said first-mentioned one of the two cantilevered arms defined at the end of the second blade.

15. A collapsible restraint as claimed in claim 14, wherein the first and second blades are pivotal to a fully closed position in which said blades substantially completely overlap each other, and wherein said cam surface extends sufficiently far around the end of the first blade to permit said first and second blades to be locked in the fully closed position.

16. A collapsible restraint as claimed in claim 15, wherein the first blade includes a first projecting flange portion extending along one longitudinal edge thereof, said flange portion providing an abutment surface for the adjacent longitudinal edge of the second blade when the blades are in the fully closed position.

17. A collapsible restraint as claimed in claim 16, wherein the greater thickness of said one cantilevered arm is continued along substantially the entire length of the second blade to form a second projecting flange portion extending along one edge of said second blade, said second projecting flange portion being symmetrically positioned relative to said first projecting flange portion and providing an abutment surface for the adjacent longitudinal edge of the first blade when the blades are in the fully closed position.

18. An apparatus for measuring the thickness of ice and other materials comprising a flexible measuring tape adapted to be lowered through a hole in the material and an elongated restraining device attached to one end of said flexible measuring tape, said restraining device comprising first and second blades pivotally connected to each other near the ends thereof, said first blade having a cam surface formed thereon and said second blade including resilient means thereon which is urged into contact with and deflected by said cam surface when the blades are pivoted relative to each other, said cam surface and said resilient means acting to provide resistance to pivoting movement between said first and second blades when said blades are in a mutual fully extended position, at least one of said first and second blades being attached to the end of said flexible measuring tape at a point near the pivotal connection between said first and second blades, whereby said first and second blades may be pivoted relative to each other from the mutual fully extended position to a collapsed position in response to a tension force applied through said flexible measuring tape, said force being sufficient to overcome the resistance provided by said cam surface and said resilient means to the pivoting movement between said first and second blades.

19. An apparatus as claimed in claim 18, wherein the second blade includes an open-ended longitudinal slot at one end thereof, said slot occupying only a portion of the length of said second blade and serving to define two integral cantilevered arms at said one end of the second blade, and wherein said resilient means comprises one of said two integral cantilevered arms, the other of said two integral cantilevered arms being pivotally connected to the first blade.

20. An apparatus as claimed in claim 19, wherein said first and second blades are pivotal to a fully closed position in which said blades substantially completely overlap each other, and wherein said cam surface and said resilient means are effective to resist pivotal movement between said blades when the blades are in the fully closed position, and further wherein said first and second blades are each provided with a projecting flange portion extending along one longitudinal edge thereof in order to provide an abutment surface for the adjacent longitudinal edge of the other blade when the blades are in the fully closed position.

* * * * *